United States Patent
Lee et al.

(10) Patent No.: US 7,140,835 B2
(45) Date of Patent: Nov. 28, 2006

(54) CORNER COOLED TURBINE NOZZLE (75) Inventors: Ching-Pang Lee, Cincinnati, OH (US); Baolan Shi, Swampscott, MA (US); Wenfeng Lu, Mason, OH (US); Joseph Michael Guentert, Cincinnati, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 149 days.

(21) Appl. No.: 10/956,299

(22) Filed: Oct. 1, 2004

(65) Prior Publication Data
US 2006/0073011 A1 Apr. 6, 2006

(51) Int. Cl.
*F01D 9/02* (2006.01)

(52) U.S. Cl. ............. 415/115; 415/189; 415/191; 415/209.3

(58) Field of Classification Search ........ 415/115, 415/189, 190, 191, 208.1, 209.3
See application file for complete search history.

(56) References Cited
U.S. PATENT DOCUMENTS

| | | | |
|---|---|---|---|
| 3,945,758 A | 3/1976 | Lee | |
| 4,353,679 A * | 10/1982 | Hauser | 415/115 |
| 4,902,198 A | 2/1990 | North | |
| 5,224,822 A * | 7/1993 | Lenahan et al. | 415/189 |
| 5,358,374 A | 10/1994 | Correia et al. | |
| 5,609,466 A | 3/1997 | North et al. | |
| 5,636,439 A * | 6/1997 | Cunha et al. | 29/889.22 |
| 6,065,928 A | 5/2000 | Rieck et al. | |
| 6,354,797 B1 | 3/2002 | Heyward et al. | |
| 6,398,488 B1 | 6/2002 | Solda et al. | |
| 6,481,959 B1 * | 11/2002 | Morris et al. | 415/115 |
| 2003/0161726 A1 * | 8/2003 | Lu | 415/190 |

* cited by examiner

*Primary Examiner*—Edward K. Look
*Assistant Examiner*—Nathan Wiehe
(74) *Attorney, Agent, or Firm*—William S. Andes; Francis L. Conte (57) ABSTRACT

A turbine nozzle includes a hollow vane joined to opposite inner and outer bands. The inner band includes a forward lip under the leading edge of the vane, an aft lip under the trailing edge of the vane, and a mounting flange spaced therebetween. An impingement bore extends obliquely and aft from the base of the mounting flange under a corner of the inner band toward the aft lip for impingement cooling thereof.

31 Claims, 6 Drawing Sheets

CORNER COOLED TURBINE NOZZLE

BACKGROUND OF THE INVENTION

The present invention relates generally to gas turbine engines, and, more specifically, to turbine nozzles therein.

In a gas turbine engine air is pressurized in a compressor and mixed with fuel in a combustor for generating hot combustion gases. Energy is extracted from the hot gases in several turbine stages following the combustor for powering the compressor and an additional output shaft for turbofan aircraft engines, or marine and industrial engine applications.

The turbine stages include stationary turbine nozzles which direct the combustion gases into corresponding rows of turbine rotor blades extending radially outwardly from the perimeter of supporting rotor disks. The first stage turbine nozzle is disposed at the outlet of the combustor and includes a row of hollow vanes supported in radially inner and outer bands.

The hot gases discharged from the combustor effect substantial thermal loads in the turbine nozzle, and cause substantial thermal expansion and contraction thereof during the operating cycle of the engine. In order to reduce thermal stresses in the nozzle, the nozzle is typically segmented circumferentially in vane doublets including two vanes mounted in corresponding inner and outer band segments. The segments have end faces or axial splitlines in which spline seals are used to connect the row of doublets in a complete annular assembly.

The spline seals seal the end faces of the nozzle segments from the hot combustion gases flowing through the turbine flowpath, as well as from the cooling air being circulated outside the outer band and inside the inner band for cooling thereof. And, the outer and inner bands adjoin the outlet end of the combustor on the forward side thereof, and adjoin the inlet end of the first stage turbine rotor blades on the aft side of the nozzle, with suitable seals therebetween.

The individual nozzle vanes include internal cooling circuits or cavities through which cooling air bled from the compressor is circulated for providing internal cooling of the nozzle vanes during operation. And, the nozzle vanes typically include various rows of film cooling holes extending through the pressure and suction sidewalls thereof for discharging the spent internal cooling air in corresponding films of air along the external surface of the vanes for providing thermal insulation from the hot combustion gases flowing thereover during operation.

The individual nozzle vanes have aerodynamic profiles, with the pressure side being generally concave and the opposite suction side being generally convex between the leading edge of the vane to the relatively thin trailing edge of the vane. The velocity and pressure distributions of the combustion gases correspondingly vary over the opposite sides of each vane for maximizing performance of the turbine in extracting energy from the combustion gases to power and rotate the turbine blades supported on the rotor disk.

In one exemplary gas turbine engine, experience has uncovered oxidation damage to the inner band of the first stage turbine nozzle which limits its useful life. The damage is localized to one corner of the inner band at the aft end thereof along the suction side of the nozzle vane. This oxidation may be due to hot gas ingestion between the inner band end faces at the aft end of the splitline due to random variations in differential pressure between the hot combustion gases on the turbine flowpath side of the inner band, and the cooling air provided on the opposite cooling side of the inner band.

Accordingly, it is desired to provide a turbine nozzle having improved cooling of the inner band to address this local oxidation problem and increase the useful life of the turbine nozzle.

BRIEF DESCRIPTION OF THE INVENTION

A turbine nozzle includes a hollow vane joined to opposite inner and outer bands. The inner band includes a forward lip under the leading edge of the vane, an aft lip under the trailing edge of the vane, and a mounting flange spaced therebetween. An impingement bore extends obliquely and aft from the base of the mounting flange under a corner of the inner band toward the aft lip for impingement cooling thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
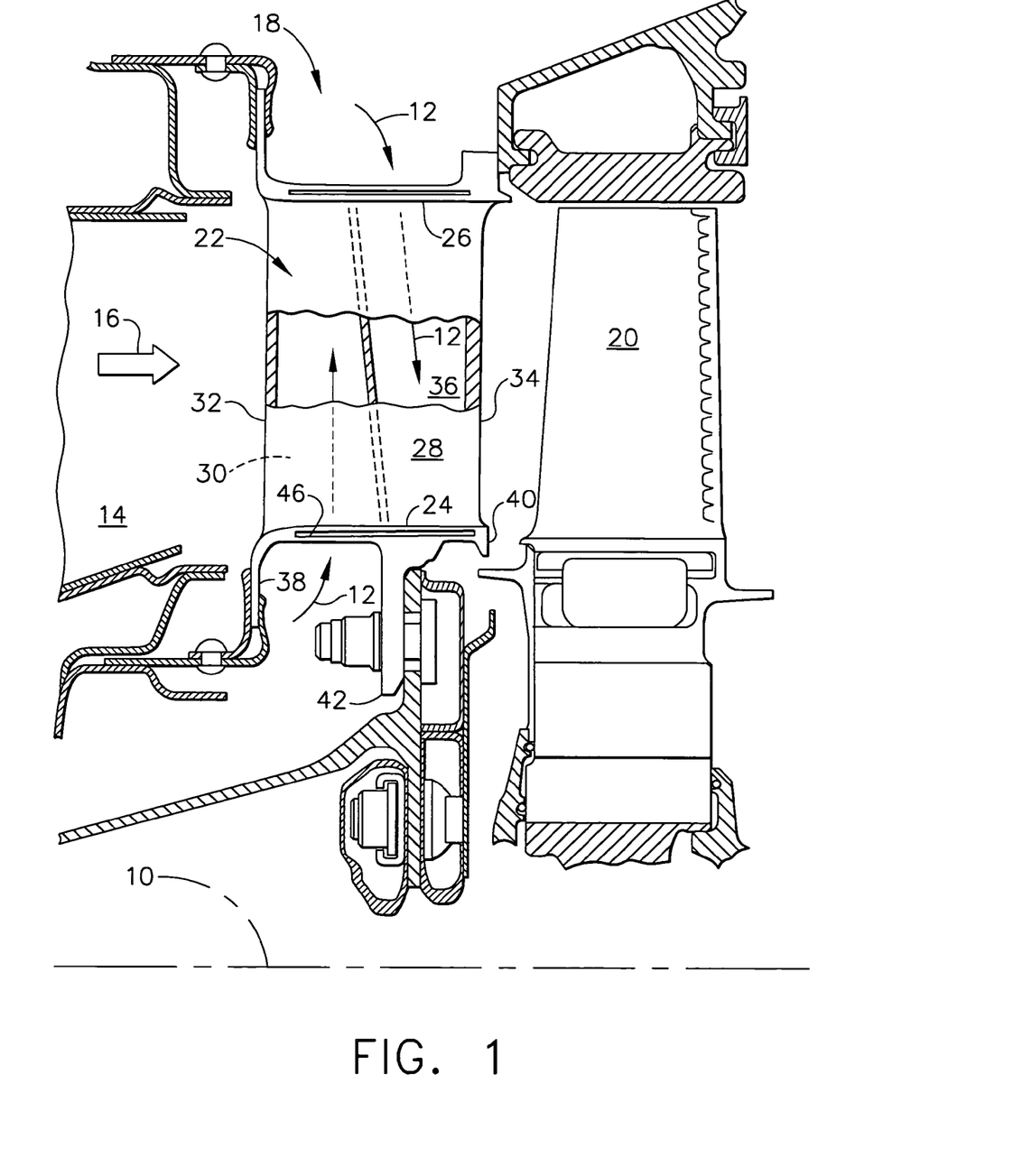
FIG. 1 is an axial sectional view of the first stage turbine portion of an exemplary gas turbine engine.

Illustrated in FIG. 1 is a portion of a gas turbine engine which is axisymmetrical about a longitudinal or axial centerline axis 10. The engine includes a multistage axial compressor (not shown) configured for pressurizing air 12 during operation. The pressurized air is mixed with fuel in a combustor 14, shown in aft part, and ignited for generating hot combustion gases 16.

The combustion gases are discharged from the annular outlet of the combustor into an annular first stage turbine nozzle 18. The turbine nozzle directs the gases into a row of first stage turbine rotor blades 20 which extend radially outwardly from a supporting rotor disk. The blades extract energy from the combustion gases to rotate the supporting disk which in turn powers the upstream compressor.

Additional turbine stages (not shown) are disposed downstream from the first stage rotor blades for extracting additional energy from the gases to power a shaft driving a fan in an aircraft turbofan engine application, or an external drive shaft in marine and industrial applications.

Figure 2:
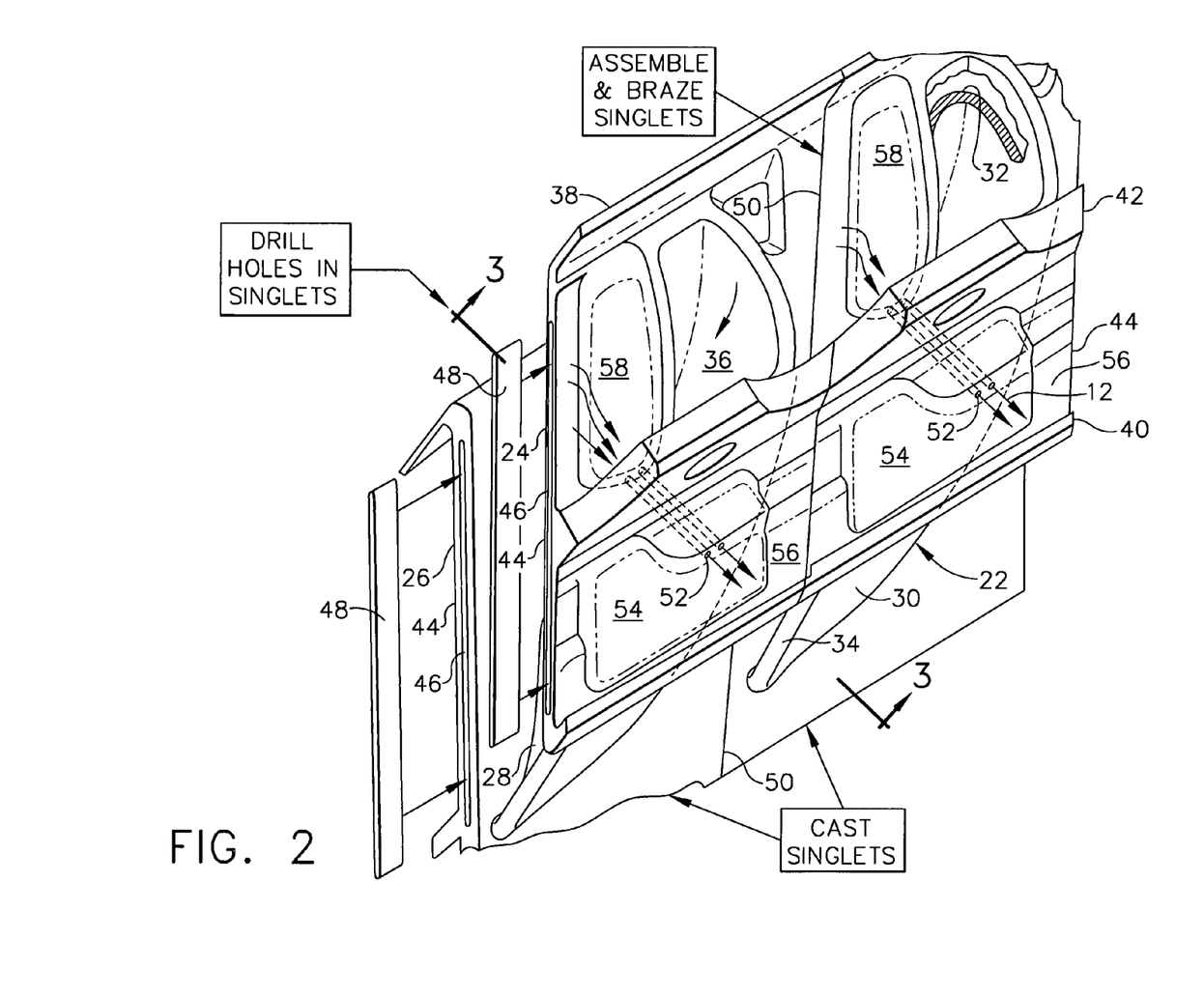
FIG. 2 is an isometric view of a portion of the first stage turbine nozzle illustrated in FIG. 1 showing the underside of the inner band thereof.

The turbine nozzle 18 illustrated in FIGS. 1 and 2 includes a row of hollow airfoil vanes 22 extending radially between and integrally joined at opposite ends to a radially inner band 24 and a radially outer band 26.

Each vane includes a generally concave pressure side 28, and a circumferentially opposite, generally convex suction side 30 which extend longitudinally or radially in span between the two bands. The two sidewalls of the vanes extend axially in chord between opposite leading and trailing edges 32,34.

Each vane also includes an internal cooling circuit or cavity 36 through which cooling air 12 bled from the compressor is circulated during operation. The cooling circuit may have any conventional configuration and typically includes multiple radial legs for circulating the coolant flow, impingement baffles, short turbulators along the inner surfaces of the sidewalls, and various rows of film cooling holes (not shown) through the sidewalls for discharging the spent internal cooling air in protective thermally insulating films of air over the external surfaces of the vane.

Each segment of the inner band 24 includes an arcuate forward lip 38 extending radially inwardly under the vane leading edge 32, and an arcuate aft lip 40 extending radially inwardly under the vane trailing edge 34. The forward lip forms a stationary seal at the aft end of the inner combustor liner to channel some of the pressurized cooling air through an inlet in the inner band into the forward cavities of the vanes. The aft lip 40 forms a rotary seal with an angel wing extending axially forward from the rotor blade.

The outer band 26 includes corresponding forward and aft lips which provide conventional seals with the outer liner of the combustor and the turbine shroud surrounding the rotor blades.

The inner band also includes a radially inwardly extending mounting flange 42 spaced axially between the forward and aft lips 38,40, and includes a plurality of apertures therethrough which receive fasteners for rigidly mounting the turbine nozzle segments to an annular supporting frame below the inner band in a conventional manner.

As illustrated schematically in FIG. 2, the turbine nozzle is conventionally manufactured by initially casting each of the individual vanes 22 and band segments 24,26 in individual singlet assemblies or unitary castings. The nozzle singlets are then brazed together in pairs to form nozzle doublets, each having two vanes integrally joined to their corresponding inner and outer bands segments.

Each of the inner and outer bands includes circumferentially opposite, axially extending end faces 44 which extend axially along rails between the forward and aft lips 38,40.

Each of the end faces 44 includes an axial slot 46 for receiving a spline seal 48 in a conventional manner for sealing adjoining band segments when assembled together in the complete ring of nozzle segments. However, the corresponding end faces of two singlets are brazed together along an axial braze joint 50 to form the corresponding nozzle doublet in which the inner and outer bands thereof are fixedly joined together to support the two nozzle vanes therein.

Each of the singlets illustrated in FIG. 2 includes four corners of the inner band along the opposite end faces thereof where they adjoin the forward and aft lips 38,40. In the doublet configuration illustrated in FIG. 2, two inboard corners of the two singlets are fixedly joined together along the common braze joint 50, with the remaining two outboard corners of each singlet being located along the corresponding axial splitlines sealed by the spline seals 48 therebetween.

As indicated above in the Background section, experience has uncovered local oxidation of the outboard corner of the inner band where the aft lip 40 meets the end face 44 on the suction side of the vane in the doublet. The aft lip 40 forms a rotary seal with the angel wing of the first stage turbine rotor blades, and the spline seals seal the end faces 44 between adjoining end faces. In this complex sealing arrangement, random variations in differential pressure between the hot combustion gases outside the inner band and cooling or purge air inside the inner band can locally increase the thermal loading of the aft, suction side corner of the inner band.

Accordingly, an impingement channel or bore 52 is formed in the inner band and extends obliquely and aft from the base of the mounting flange 42 under the aft corner of the inner band toward the aft lip 40 for locally impingement cooling this region of the inner band to offset the local thermal loading thereof. Furthermore, the cooling air discharged from the impingement bore 52 increases the pressure under the inner band and further opposes ingestion of hot combustion gases during operation.

In order to reduce thermal mass and weight, the inner band 24 illustrated in FIG. 2 includes an open aft pocket 54 recessed into the inner surface thereof between the mounting flange 42 and the aft lip 40 behind corresponding ones of the vanes. An aft pocket 54 is provided in each of the singlets below the trailing edge of each of the two vanes. And, the impingement bore 52 is provided in each nozzle singlet disposed in the corresponding sidewalls of the two aft pockets 54, and extending or aimed obliquely aft toward the base of the aft lip 40 at the inner band corners.

In this way, impingement air 12 is locally directed to the outboard corner of the nozzle doublet in front of the aft lip 40, as well as the inboard corner along the braze joint 50 in front of the aft lip. The two singlets are therefore configured identically with the introduction of the impingement bores 52 for cooling corresponding corners of the inner bands similarly, while having particular cooling effectiveness for the exposed outboard corner where the aft lip joins an adjacent nozzle segment along the spline seal.

The aft pockets 54 illustrated in FIG. 2 are locally recessed regions of the inner surface of the inner band for reducing the thickness thereof, and are surrounded in most part by a corresponding thicker rim 56 which surrounds the pockets along the end faces and aft lip aft of the mounting flange 42. The impingement bores 52 are preferably aimed through the corresponding aft pockets 54 toward the rim 56 at the aft lip 40. This is illustrated in more detail in FIG. 3.

The impingement bores 52 illustrated in FIG. 2 are preferably directed or aimed from the vane suction side 30 toward the aft corners at the aft lip 40, and preferably obliquely or substantially perpendicular from the suction side.

For example, each aft pocket 54 includes two of the impingement bores 52 extending parallel to each other through the mounting flange 42 toward corresponding corners of the singlets. In this way, both the inboard and outboard corners of the singlets along the common aft lip 40 are impingement cooled from below the inner bands, and the spent impingement air increases the pressurization under the aft end of the inner bands for preventing local ingestion of combustion gases along the spline joints.

Figure 3:
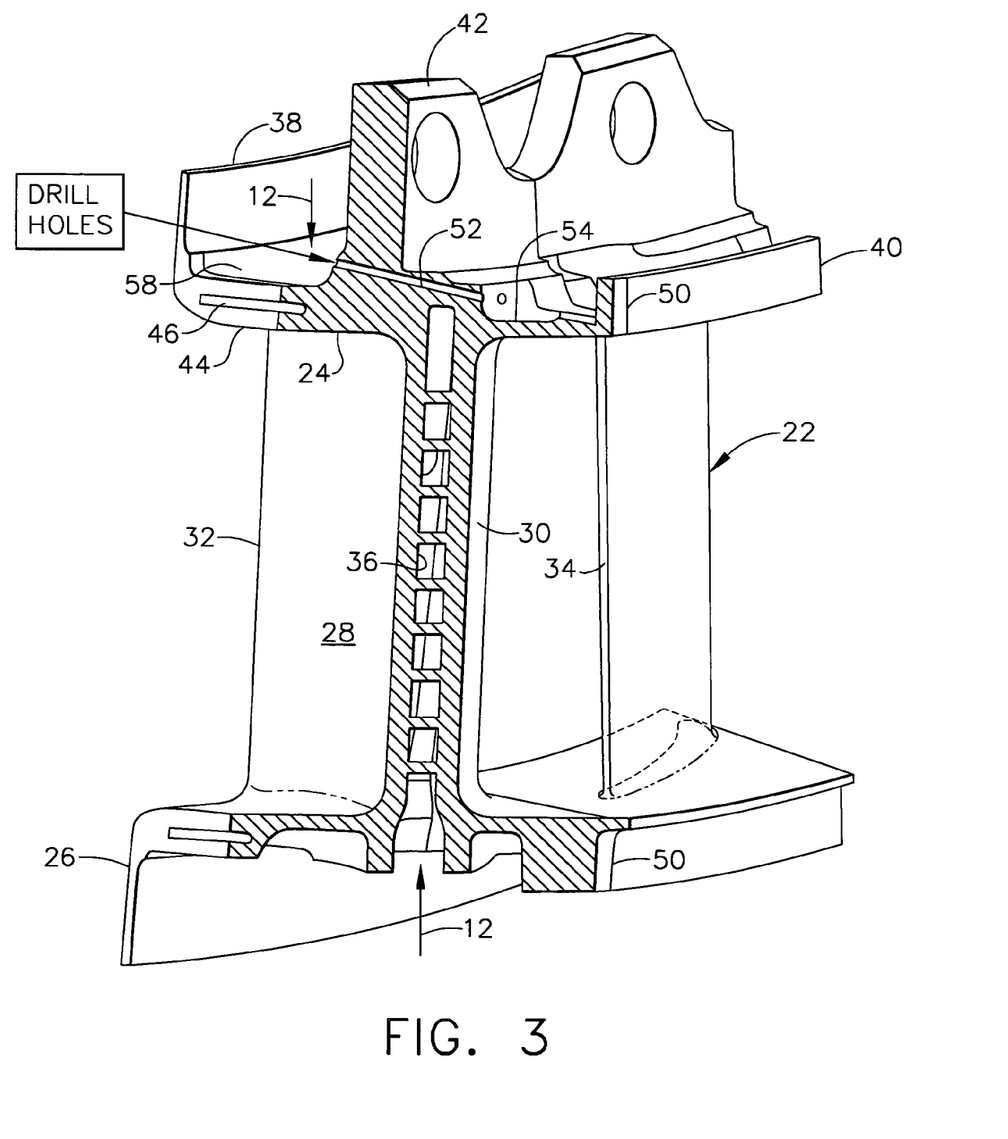
FIG. 3 is a transverse sectional view through the nozzle segment illustrated in FIG. 2 and taken along line 3—3.

In the exemplary embodiment illustrated in FIGS. 2 and 3, the inner band 24 further includes an open forward pocket 58 recessed into the inner surface thereof within a surrounding rim, and located between the mounting flange 42 and the forward lip 38 along the pressure side 28. The two impingement bores 52 extend through the base of the mounting flange 42 in flow communication between the forward and aft pockets 58,54.

In this way, a portion of the pressurized cooling air 12 provided to the vane inlet through the inner band forward of the mounting flange is diverted directly through the impingement bores 52 for locally cooling the corresponding corners of the aft lip 40, while also pressurizing the aft pockets below the inner band.

As shown in FIG. 3, the impingement bores 52 are inclined in line-of-sight from outside the forward pocket 58, through the base of the mounting flange 42, and into the aft pocket 54 toward the base of the aft lip 40. This orientation of the impingement bores hides these bores behind the radial extension of the aft lip 40 and ensures effective impingement cooling of the forward side of the aft lip In this embodiment illustrated in FIGS. 2 and 3, the spline seal slot 46 extends from the forward lip 38 to aft lip 40 along the relatively thick rim of the inner band which bounds both the forward pocket 58 and the aft pocket 54.

As shown in FIG. 3, the internal cooling cavity 36 of each vane 22 includes a second, aft inlet through the outer band 26 and terminates in the inner band 24 at the base of the mounting flange 42. The impingement bores 52 are suitably inclined through the base of the mounting flange to bypass the internal cooling cavity 36 and provide flow communication solely between the forward and aft pockets 58,54, without compromising performance of the internal cooling cavity 36.

Figure 4:
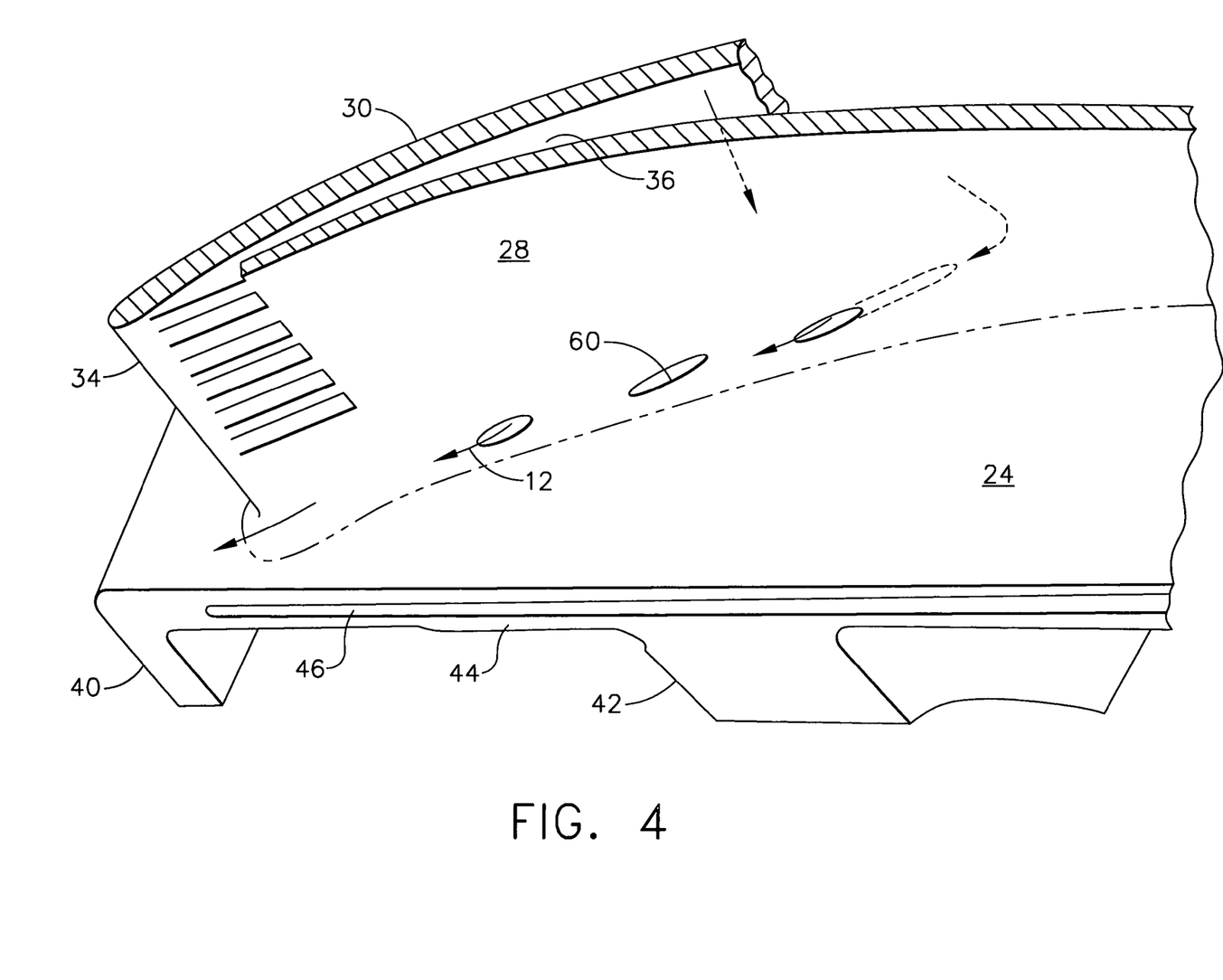
FIG. 4 is an isometric view of a portion of the turbine nozzle illustrated in FIG. 2 showing the junction of the trailing edge of the vane along the pressure side thereof with the inner band.

Whereas the impingement bores 52 are specifically configured for cooling the underside corners of the inner band along the aft lip 40, a plurality of film cooling holes 60 as shown in FIG. 4 are inclined through the root junction of the vane pressure side 28 with the inner band toward the trailing edge 34 in flow communication with the internal cooling cavity 36.

The row of film cooling holes 60 provides film cooling of the corresponding corners of the inner band along the aft lip 40 using spent cooling air from inside the vane cavity 36, while the impingement bores 52 illustrated in FIG. 3 use inlet air from the forward pocket 58 to impingement cool the corresponding corners of the inner band inside the aft lip 40 independently of the vane cavity 36.

The inclined orientation of the impingement bores 52 illustrated in FIGS. 2 and 3 hides these bores behind the radially inwardly extending aft lip 40. Accordingly, in order to manufacture the impingement bores, the nozzle singlets are first cast, and then the impingement bores 52 are drilled using conventional laser drilling or electrical discharge machining (EDM) through the mounting flange 42 from the forward pocket 58.

Access is provided above or over the forward pocket 58 for drilling the impingement bores straight through the base of the mounting flange 42 toward the aft pocket 54 to clear the forward lip 38 along the end face 44 on the pressure side 28 of the vane. The circumferentially oblique orientation of the impingement bores illustrated in FIG. 2, and their shallow axial inclination as illustrated in FIG. 3 permit their construction by directing the drilling process in the small available space provided along the pressure-side end face 44 of the inner band at the end of the forward lip 38.

For each nozzle segment illustrated in FIG. 2, a pair of the singlets are cast, and each includes a single vane 22 and integral bands 24,26. The impingement bores 52 are then drilled in both of the singlets. The two singlets are then brazed together at the corresponding end faces along the inner and outer bands to form the doublet. The finished doublet therefore includes the two sets of impingement bores 52 terminating in the sidewalls of the aft pockets 54 in alignment with the hidden forward surface of the aft lip 40 for providing impingement cooling thereof.

Figure 5:
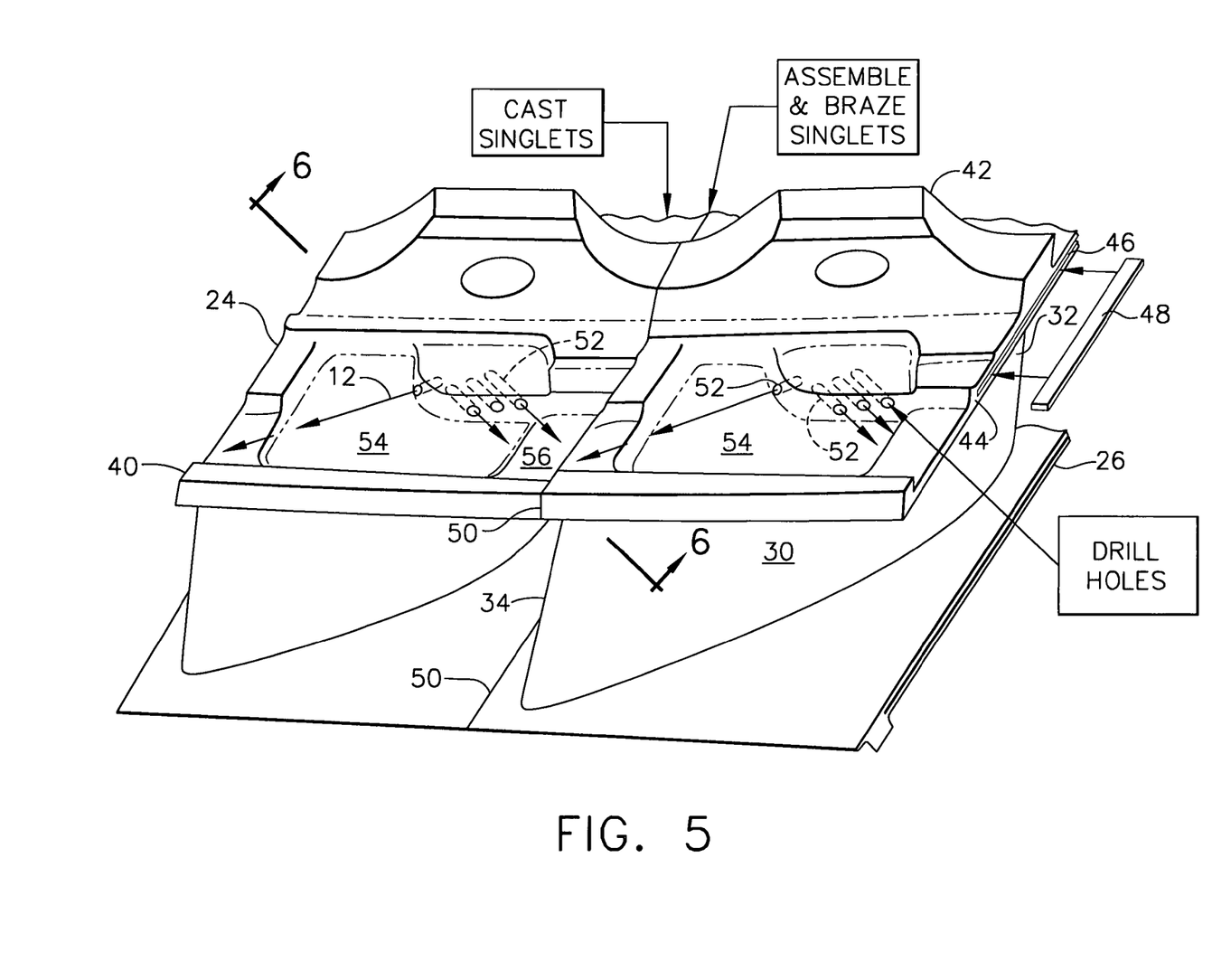
FIG. 5 is an isometric view of the nozzle segment illustrated in FIG. 2 in accordance with an alternate embodiment.
Figure 6:
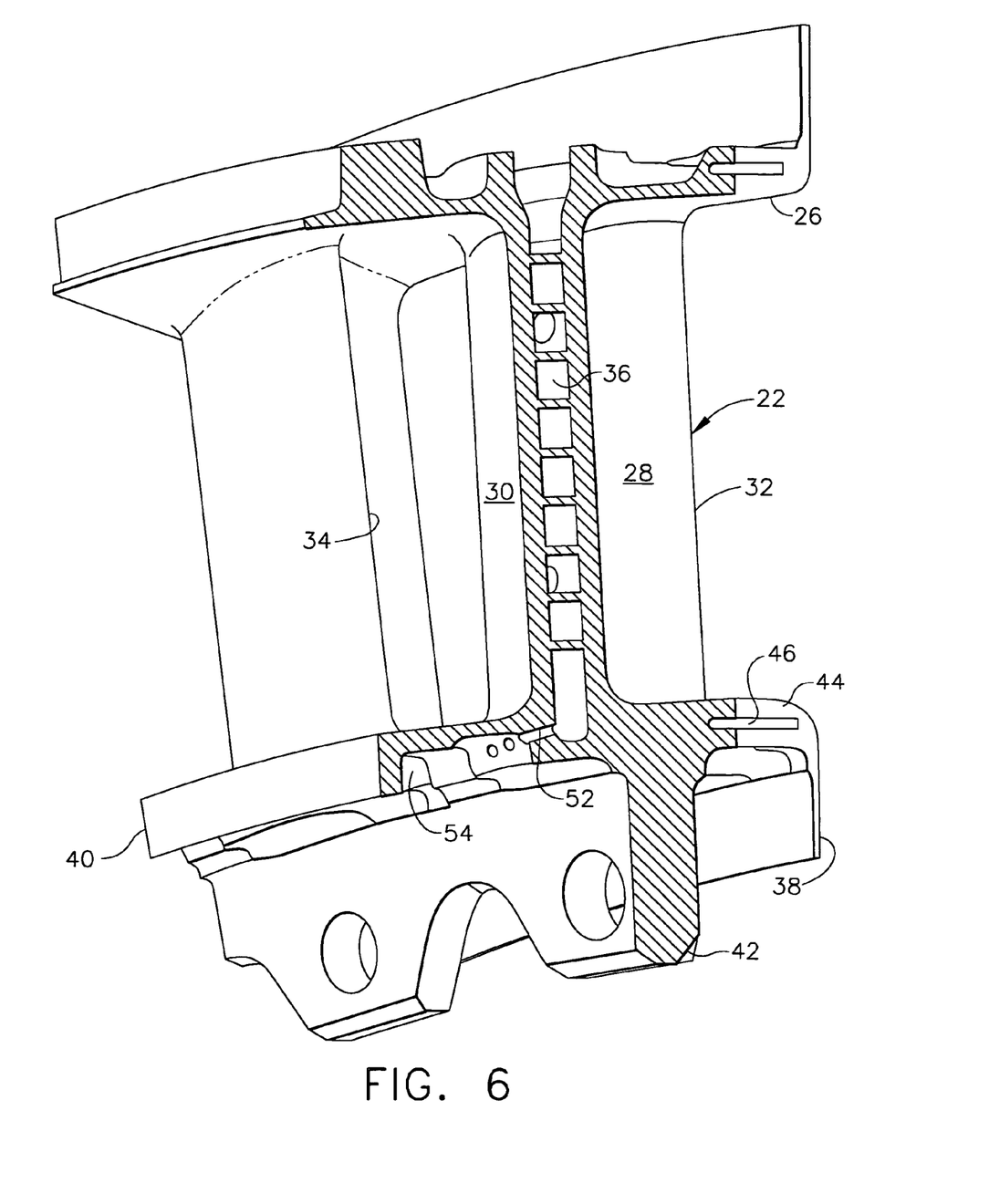
FIG. 6 is a transverse sectional view through the nozzle segment illustrated in FIG. 5 and taken along line 6—6.

FIGS. 5 and 6 illustrate an alternate embodiment of the turbine nozzle which is otherwise identical to the first embodiment disclosed above except for the placement of the impingement bores, and the configuration of the spline seals. More specifically, the impingement bores 52 commence in the lower end of the internal cooling cavity 36 at the base of the mounting flange 42 for discharging cooling air from the cooling cavity into the aft pocket 54 in impingement against the aft lip 40. Each impingement bore 52 therefore includes an inlet in the internal vane cavity 36, and an outlet in the sidewall of the aft pocket 54, with each bore being aimed obliquely aft toward the aft lip.

In this embodiment, the impingement bores 52 are inclined from the aft lip 40 as illustrated in FIG. 6 into the aft pocket 54 at the base of the mounting flange 42 to reach the internal vane cavity 36 terminating radially above the mounting flange.

As shown in FIG. 5, three of the impingement bores 52 extend in parallel with each other from the vane cavity 36 toward the common inner band corner.

Whereas the three parallel impingement bores 52 extend generally perpendicularly from the suction side 30 of the vane, an additional impingement bore 52 is also provided and extends generally parallel to the suction side 30 toward the opposite corner of the inner band at the aft lip 40.

In this way, the several impingement bores 52 radiate laterally outwardly from the common internal vane cavity to direct cooling air in impingement against the two opposite corners of the inner band at the aft lip 40. In the doublet configuration illustrated in FIG. 5, the several impingement bores cooperate together to cool the corresponding corners of the inner band at the exposed end faces 44 as well as at the braze joint 50.

In the second embodiment illustrated in FIGS. 5 and 6, the rim 56 surrounding the aft pockets 54 is thinner than in the first embodiment disclosed above and the slot 46 for the spline seal 48 extends forward from the forward lip and terminates short of the aft lip 40 at the rim which bounds the side of the aft pocket 54 along the end face 44.

This thinner configuration of the inner band permits drilling of the impingement bores 52 from the aft lip 40, instead of from the forward lip 38 in the first embodiment. In both embodiments, the vanes and bands are initially cast in the singlet configuration disclosed above. The impingement bores 52 are then drilled from the aft lip 30 along the thinner rim 56 at one end face bounding the aft pockets 54 through the sidewalls of the aft pocket into the vane internal cavity 36. In laser drilling, for example, the beam path avoids hitting the aft lip 40 itself and utilizes the oblique orientation of the impingement bores for drilling thereof over the thin pocket rim 56 exposed along the two end faces 44 of each singlet.

As shown in FIG. 5, three exemplary impingement bores 52 enter the aft pocket 54 over the suction-side end wall 44, and a single impingement bore 52 enters the aft pocket over the opposite, pressure-side end wall 44.

After the bores are drilled, the two singlets are bonded together at the common braze joint 50 in the inner and outer bands. The full row of nozzle doublets are assembled together and sealed with the corresponding spline seals 48 therebetween.

The obliquely inclined impingement bores 52 are then directed towards the axial splitlines and braze joints 50 at the aft corners of the inner bands along the aft lip 40 for impingement cooling the forward surface of the aft lip during operation. And, the spent impingement air under the inner bands additionally pressurizes this region for reducing the likelihood of hot gas ingestion at the axial splitlines aft of the spline seals 48.

The various embodiments disclosed above introduce preferentially located impingement bores obliquely under the inner bands to impingement cool the local hot spots experienced at the inner band corners bounding the axial splitlines at the aft lip. The impingement air will also increase the air pressure in the aft cavity under the inner band and prevent hot gas injection through the axial splitlines or small gaps thereat.

A significant reduction in temperature of the aft lips may be obtained for substantially reducing or eliminating premature oxidation thereof. The impingement bores may be introduced into existing design turbine nozzle castings without requiring any modification of the casting process. The bores are simply drilled following singlet casting and prior to forming the doublet configurations.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention. Accordingly, What is desired to be secured by Letters Patent of the United States is the invention as defined and differentiated in the following claims in which we claim:

1. A turbine nozzle comprising:
a pair of hollow vanes integrally joined at opposite ends to inner and outer bands, and each vane including opposite pressure and suction sides extending in span between said bands, and extending in chord between opposite leading and trailing edges;
said inner band including a forward lip under said leading edges, an aft lip under said trailing edges, and a mounting flange spaced therebetween; and
a plurality of impingement bores extending obliquely and aft from the base of said mounting flange below said vanes toward said aft lip for impingement cooling thereof.

2. A nozzle according to claim 1 wherein said inner band further includes a pair of open aft pockets recessed into the inner surface thereof between said mounting flange and said aft lip behind corresponding ones of said vanes, and said impingement bores are disposed in sidewalls of said aft pockets and aimed obliquely aft toward the base of said aft lip.

3. A nozzle according to claim 2 wherein:
said inner band further includes opposite end faces extending between said forward and aft lips, a braze joint between said vanes, and a rim surrounding each of said aft pockets along said end faces, joint, and aft lip aft of said mounting flange; and
said impingement bores are aimed through said aft pockets toward said rim at said aft lip.

4. A nozzle according to claim 3 wherein said impingement bores are aimed from said vane suction sides toward corresponding corners of said inner band where said aft pockets meet said aft lip and rim along said joint and end face.

5. A nozzle according to claim 4 wherein said impingement bores are aimed obliquely from said suction side of said vanes toward said corners.

6. A nozzle according to claim 4 wherein said impingement bores extend generally parallel to said suction side of said vanes toward said corners.

7. A nozzle according to claim 4 wherein one impingement bore extends obliquely from said suction side toward one corner, and another impingement bore extends generally parallel to said suction side toward an opposite corner.

8. A nozzle according to claim 4 wherein:
said inner band further includes a pair of open forward pockets recessed into the inner surface thereof between said mounting flange and said forward lip along corresponding pressure sides of said vanes; and
said impingement bores extend through said mounting flange in flow communication between said forward and aft pockets.

9. A nozzle according to claim 4 wherein said vanes include cooling cavities therein terminating at the base of said mounting flange, and said impingement bores commence in said cavities for discharging cooling air therefrom into said aft pockets in impingement against said aft lip.

10. A method of making said turbine nozzle according to claim 4 comprising:
casting said vanes and bands in two separate singlet assemblies;
drilling said impingement bores through the sidewalls of said aft pockets; and
brazing together said two singlets in a doublet.

11. A turbine nozzle comprising:
a hollow vane integrally joined at opposite ends to inner and outer bands, and including opposite pressure and suction sides extending in span between said bands, and extending in chord between opposite leading and trailing edges;
said inner band including a forward lip under said leading edge, an aft lip under said trailing edge, and a mounting flange spaced therebetween; and
an impingement bore extending obliquely and aft from the base of said mounting flange under a corner of said inner band toward said aft lip for impingement cooling thereof.

12. A nozzle according to claim 11 wherein said inner band further includes an open aft pocket recessed into the inner surface thereof between said mounting flange and said aft lip, and said impingement bore is disposed in a sidewall of said aft pocket aimed obliquely aft toward the base of said aft lip at said inner band corner.

13. A nozzle according to claim 12 wherein:
said inner band further includes opposite end faces extending between said forward and aft lips, and a rim surrounding said aft pocket along said end faces and aft lip aft of said mounting flange; and
said impingement bore is aimed through said aft pocket toward said rim at said aft lip.

14. A nozzle according to claim 13 wherein said impingement bore is aimed from said vane suction side toward said corner at said aft lip.

15. A nozzle according to claim 14 wherein said impingement bore is aimed obliquely from said suction side toward said corner.

16. A nozzle according to claim 14 wherein said impingement bore extends generally parallel to said suction side toward said corner.

17. A nozzle according to claim 14 wherein one impingement bore extends obliquely from said suction side toward said corner, and another impingement bore extends parallel to said suction side toward an opposite corner.

18. A nozzle according to claim 14 wherein:
said inner band further includes an open forward pocket recessed into the inner surface thereof between said mounting flange and said forward lip along said vane pressure side; and
said impingement bore extends through said mounting flange in flow communication between said forward and aft pockets.

19. A nozzle according to claim 18 wherein said impingement bore is inclined from outside said forward pocket, through the base of said mounting flange, and into said aft pocket toward the base of the said aft lip.

20. A nozzle according to claim 18 further comprising a plurality of said impingement bores extending parallel to each other through said mounting flange toward said corner.

21. A nozzle according to claim 18 wherein said end face along said vane suction side includes a slot for receiving a spline seal, and said slot extends from said forward lip to said aft lip along said rim bounding said aft pocket.

22. A nozzle according to claim 18 wherein said vane includes a cooling cavity terminating at the base of said mounting flange, and said impingement bore bypasses said cavity to provide flow communication between said forward and aft pockets.

23. A nozzle according to claim 22 further comprising a plurality of film cooling holes inclined through the junction of said vane pressure side with said inner band toward said trailing edge in flow communication with said cooling cavity.

24. A method of making said turbine nozzle according to claim 18 comprising:
casting said vane and bands in an integral assembly; and
drilling said impingement bore through said mounting flange from said forward pocket toward said aft pocket to clear said forward lip along said end face on said pressure side of said vane.

25. A method according to claim 24 further comprising:
casting a pair of singlets each including a vane and integral bands;
drilling said impingement bores in both of said singlets; and
brazing together said singlets at corresponding end faces thereof along said inner and outer bands to form a doublet.

26. A nozzle according to claim 14 wherein said vane includes a cooling cavity terminating at the base of said mounting flange, and said impingement bore commences in said cavity for discharging cooling air therefrom into said aft pocket in impingement against said aft lip.

27. A nozzle according to claim 26 wherein said impingement bore is inclined from said aft lip into said aft pocket at the base of said mounting flange.

28. A nozzle according to claim 26 further comprising a plurality of said impingement bores extending parallel with each other from said cavity toward said corner.

29. A nozzle according to claim 26 wherein said end face along said vane suction side includes a slot for receiving a spline seal, and said slot extends from said forward lip short of said aft lip along said rim bounding said aft pocket.

30. A method of making said turbine nozzle according to claim 26 comprising:
casting said vane and bands in an integral assembly; and
drilling said impingement bore from said aft lip along said rim bounding said aft pocket through said sidewall thereof into said vane cavity.

31. A method according to claim 30 further comprising:
casting a pair of singlets each including a vane and integral bands;
drilling said impingement bores in both of said singlets; and
brazing together said singlets at corresponding end faces thereof along said inner and outer bands to form a doublet.

* * * * *